March 1, 1960     A. C. PURPURA     2,927,189
ELECTRIC TIME AND HEAT CONTROLLED FRYING PAN
Filed Aug. 22, 1956     2 Sheets-Sheet 2
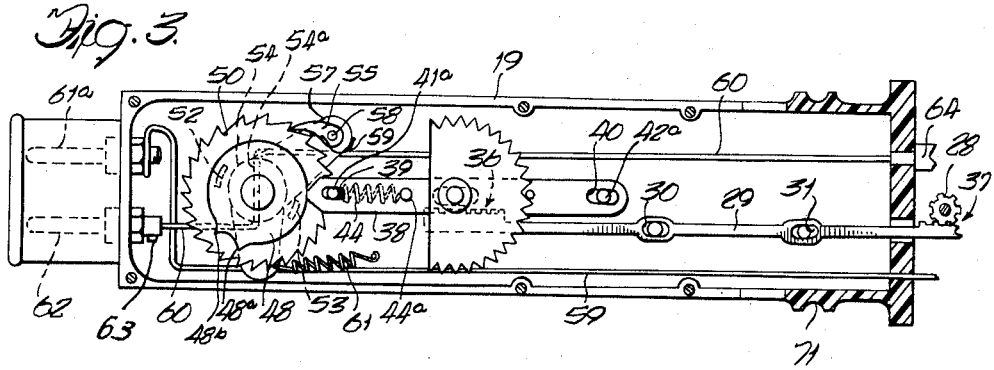
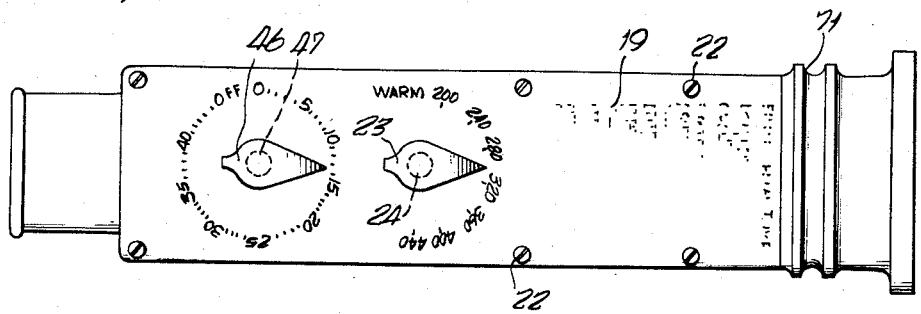
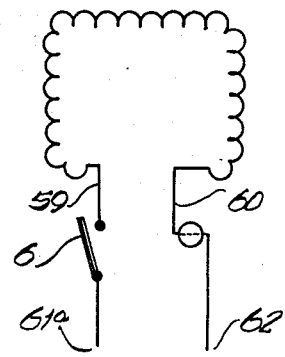

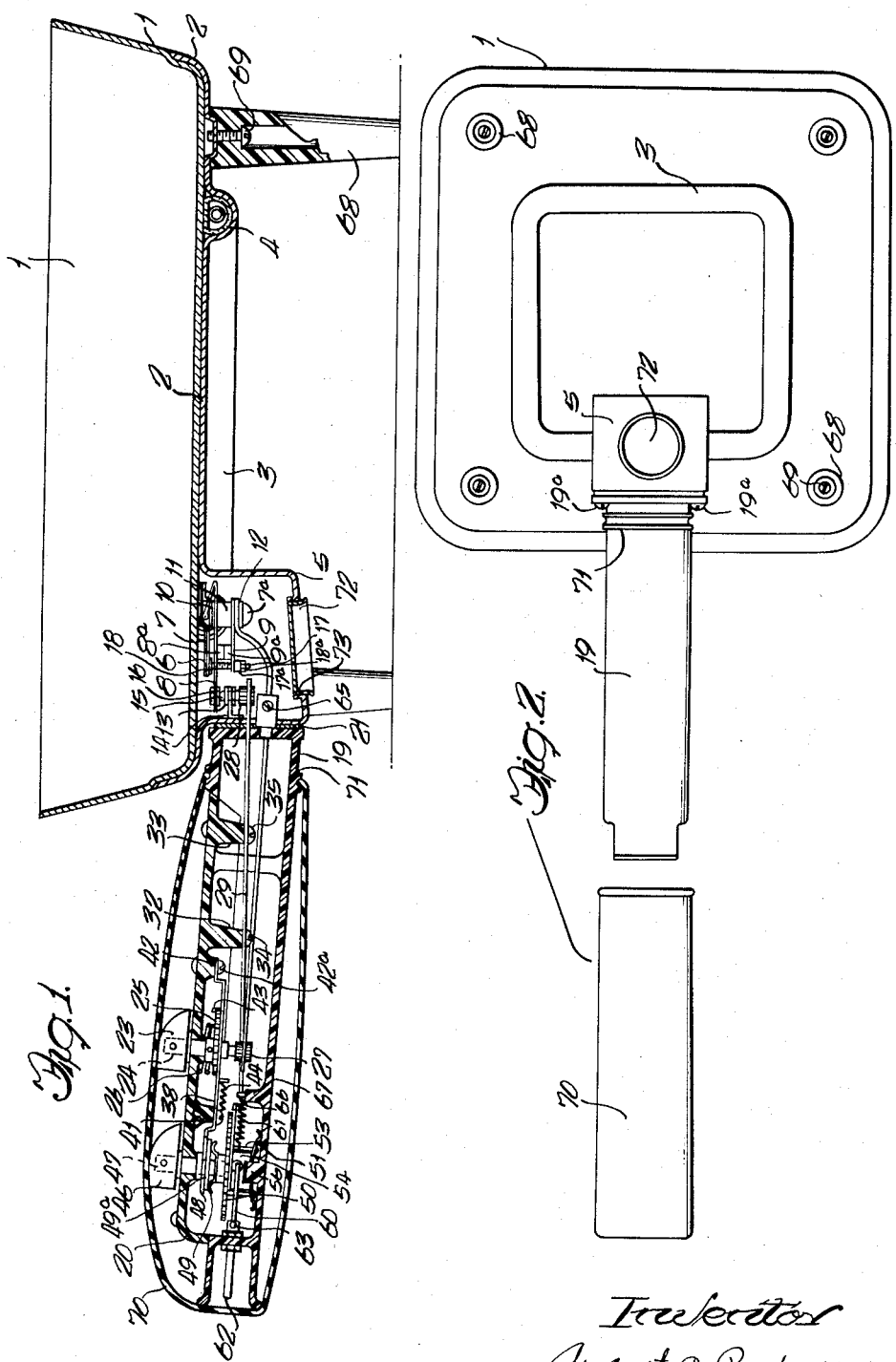

United States Patent Office 2,927,189
Patented Mar. 1, 1960

2,927,189

ELECTRIC TIME AND HEAT CONTROLLED FRYING PAN

August C. Purpura, Berwyn, Ill., assignor to Sunbeam Corporation, Chicago, Ill., a corporation of Illinois Application August 22, 1956, Serial No. 605,604

21 Claims. (Cl. 219—44)

The invention relates to a new fully automatic electrically heated frying pan which is not only automatic in maintaining any desired frying temperature but in addition can be set for terminating the frying operation at the end of a predetermined timing period.

Another object of the invention is to produce an electrically heated frying pan having a manual heat control knob which can be set to any temperature within a cooking range and which will automatically return to its low temperature setting for maintaining the cooked article at its proper eating temperature and thus prevent the food from becoming cold before it can be eaten.

Another object of the invention is to produce a frying pan which will require no watching on the part of the operator after the proper temperature is set and the proper timing period is selected.

Another object of the invention is to produce a fully automatic frying pan which will be simple in construction and which can be manufactured at a low cost and which will give long and satisfactory service.

Another object of the invention is to produce a fully automatic frying pan whose temperature and timing mechanism is controlled solely by a simple bimetal strip.

Another object of the invention is to time a frying operation by utilizing the time lag in making and breaking the circuit to the heating element by the bimetal strip for maintaining the desired frying temperature and thereby control the means for actuating a new novel timing mechanism. I have found that the bimetal strip requires about a minute and 20 seconds to make and break the circuit to the heating element for maintaining the frying pan at any predetermined temperature setting within the cooking range after the frying pan has been preheated from its original room temperature. A timing dial calibrated for timing a plurality of frying operations is actuated by a current carrying wire which is heated when carrying current to the frying pan heating element thereby expanding in length and when the current to the heating element is momentarily interrupted the wire cools and contracts quickly; this expansion and contraction provides the power necessary to actuate the timing mechanism. It must be understood that the figures on the dial of the timer do not indicate the cooking time in minutes but merely comprise a scale which is calibrated for obtaining the proper frying time for any food shown on the chart printed on the handle.

Another object of the invention is to produce an electrically heated frying pan which can be made entirely from stampings made preferably from stainless steel.

Another object of the invention is to produce a frying pan that will be water proof and can be immersed in water up to the dials on the handle.

Another feature of the invention is a rubber glove so designed that it can be slipped over the handle and thereby render the entire frying pan water proof.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein: Fig. 1 is a longitudinal vertical section through the frying pan. Fig. 2 is the bottom view on a smaller scale of Fig. 1 showing the rubber glove removed from the handle. Fig. 3 is the top view of the handle with the handle cover removed. Fig. 4 is the top view of the handle when completely assembled showing the timing and heat control dials. Fig. 5 is enlarged partial top view of the handle showing the chart with the necessary instructions for setting the time and temperature for frying various foods. Fig. 6 is the wiring diagram for the heating element of the frying pan.

Referring to the drawings part 1 is a suitable pan being a drawn stainless steel stamping and directly below the pan 1 is another stainless steel stamping 2 however this stamping is drawn only a fraction of the depth of the stamping 1 and fits tightly around the bottom of the sides of the pan 1; both pan 1 and lower stamping 2 are fused together by either spot or butt welding.

The stamping 2 has drawn therein a channel 3 which is somewhat circular in cross section and which supports an electric heating element mounted in a tube 4 which is directly below and in close heat conduction with the pan 1. A box like housing 5 is also drawn from the lower member 2 and is located at thte ends of channel 3. Within this housing 5 is located the bimetal strip 6 which is spot welded on the bottom side of pan 1 and spot welded on one end of bimetal strip 6 is an arm 7. Mounted on arm 7 are switch blades 8 and 9 with contacts 8A and 9A. Suitable insulation 10, 11, and 12 insulate the blades 8 and 9 and the arm 7. A screw 7A holds the blades 8 and 9 on arm 7. A threaded bushing 13 is mounted on an arm 14 which is spot welded on housing 5 and is located directly below the switch blade 8. A threaded shaft 15 screws into the bushing 13 and the top end of the threaded shaft 15 engages the insulated part 16 mounted on the end of the switch blade 8 thereby varying the gap between bimetal 6 and adjusting screw 17 which screws through threaded boss 17A mounted on blade 9.

An insulated part 18 is secured to the bimetal 6 located above the screw 17, a lock nut 18A locks the adjusting screw after the heat control is properly calibrated. It must be understood that the blades 8 and 9 are made of a spring material and are tensioned so that they are in circuit closing position at all times until the bimetal strip 6 moves the blade 9 away from blade 8 after the predetermined temperature of the pan 1 is reached.

A plastic handle 19 is secured by screws 19A to the outside wall of housing 5. A water proof gasket 21 is mounted between the handle 19 and wall of housing 5.

Mounted on top of the handle 19 is a plastic cover 20 which fits snugly around the open top of handle 19 which is secured to the handle 19 by screws 22; on top of cover 20 is a temperature adjusting knob or dial 23 that is secured to a vertical shaft 24 which extends through the cover 20. Mounted on the shaft 24 below the cover 20 and within the handle 19 is a partial disc 25 having V-shaped teeth. There is a V-shaped tooth for every temperature setting of the dial 23. A coiled spring 26 is located between the bottom side of cover 20 and the top portion of partial disc 25, one end of the coiled spring 26 is connected to the top cover 20 and the other end of coiled spring 26 is fastened to the partial disc 25 and is tensioned so as to constantly urge the shaft 24 and handle 23 to its low temperature or warming position.

The control of heat by the dial or knob 23 is accomplished as follows: mounted on the lower end of shaft 24 is a small gear 27 and mounted on the lower end of threaded shaft 15 is a gear 28; a member 29 with gear rack teeth on each end slides back and forth on slots 30 and 31 and is secured to bosses 32 and 33 on the bottom side of handle cover by screws 34 and 35. The gear rack teeth 36 on member 29 is in mesh with the gear 27 on the shaft 24 and on the opposite end of member 29 are gear rack teeth 37 that is in mesh with gear 28 so that when knob or dial 23 is turned the gear 27 will move the member 29 through gear rack teeth 36 and thus the gear rack 37 will turn gear 28 that is mounted on threaded shaft 15 which will vary the gap between the bimetal strip and the switch blade 9 which in turn will vary the heat to conform with the temperature scale on cover 20.

To resiliently lock the knob 23 at any desired temperature during a cooking operation I provide a member 38 which slides back and forth on slots 39 and 40 and which is secured to bosses 41 and 42 by screws 41A and 42A. The bosses 41 and 42 are molded on the bottom side of cover 20. On one end of member 38 and adjacent the outer edge of partial disc 25 is a lock pin 43 that is riveted on member 38. A spring 44 connected between boss 44A on the member 38 and screw 41A holds lock pin 43 in locking engagement between the V-shaped teeth on the outer edge of partial disc 24, thus resiliently holding partial disc 25 at any position desired against the pressure of the spring 26 during a frying or cooking operation. I provide means to unlock the partial disc 25 by simply moving the pin 43 out of engagement from between the V-shaped teeth of the partial disc 25 by a simple timing mechanism whose operation and construction is as follows: the timing mechanism consists of a knob or dial 46 mounted above the cover 20 and on a vertical shaft 47 that extends through and below cover 20. On the lower end of shaft 47 is a friction clutch which permits the turning of the dial clockwise without turning the ratchet wheel 50. The friction clutch consists of a cam disc 48 secured on shaft 47 and directly below cam disc 48 is a friction clutch disc 49A made of leather or other suitable material; directly below the friction clutch disc 49A is another disc 49 that is riveted on a ratchet disc 50. A thrust spring washer 51 located a substantial distance below the ratchet wheel 50, imparts spring pressure through pins 52 and 53, against the bottom of ratchet wheel 50 and thereby directly to disc 49 and against friction clutch disc 49A and then thereto against cam disc 48 mounted on shaft 47 so that when dial or knob 46 is turned clockwise only the cam disc 47 will turn while imparting only a slipping action against ratchet wheel 50 which is unable to turn because it is locked by pawl 55 against the ratchet teeth of ratchet wheel 50.

Directly below ratchet wheel 50 and above thrust spring washer 51 is a free space and mounted therebetween is a porcelain bushing 54 having a vertical hole that extends up from the bottom of the bushing 54 approximately ⅓ of the height of the bushing 54 which is supported by a partial shaft 56 that extends up into the vertical hole of the bushing 54; the vertical shaft 56 is molded inside of the top part of the plastic handle 19. Mounted on the top of bushing 54 and secured thereto is an L-shaped member 57. On the extreme end of L-shaped member is mounted a pawl 55 which is freely secured to the L member 57 by a rivet 58. A small spring 59 having one end fastened to a pawl 55 and the other end to the L-shaped member 57 is so tensioned that it forces the pawl 55 into engagement with the teeth of ratchet wheel 50. Thus when bushing 54 oscillates, each anti-clockwise stroke will advance the ratchet wheel 50 by one tooth and the following clockwise stroke will return the pawl 55 in position to engage the following tooth so that it may advance it on its next anti-clockwise stroke another tooth. There being 50 ratchet teeth on the ratchet wheel that fill the outside diameter of the ratchet wheel 50. In the drawing less than 50 teeth are shown for purpose of simplicity. As the ratchet wheel 50 is advanced in an anti-clockwise direction it turns the cam disc 48 through the friction clutch parts 49A, 49, until the cam portion 48A of cam disc 48 engages with and moves the member 38 and the lock pin 43 riveted on the member 38 out of engagements from between the V-shaped teeth of partial disc 25 thereby unlocking it and permitting the spring 26 to return the shaft 24 so that the dial 23 returns to low temperature or warming position. If the operator desires to use the frying pan without using the automatic timing feature, it is only necessary to move the dial or knob 46 in an anti-clockwise direction until the pointer of the knob 46 is directly opposite the indication Off which will then move the cam 48A away from the locking member 38 and permit the spring 44 to move the member 38 back in the low part of the cam disc 48 between the cam part 48A and the stop part 48B, thus moving the lock pin 43 into locking engagement with the V-shaped teeth of partial disc 25.

I provide means for oscillating the bushing 54 intermittently as follows: an electric current carrying heating element wire 60 which has one end securely connected to terminal 62 by a set screw 63, the current carrying wire 60 then passes through a horizontal hole 54A in bushing 54, the hole 54A being approximately at right angle to the length of the wire 60. The wire 60 then continues on through the handle 19 where it passes through a shouldered bushing 64 that is pressed on the wall of the outer end of the handle 19. The wire 60 is locked in the bushing 64 by a set screw 65; the wire 60 then continues on loosely and is connected to switch blade 9. A heavy spring 61 having one end hooked on a pin 66 that is molded in the plastic boss 67 and the other end of spring 61 is connected to the short end of the L-shaped member 57; the spring therefore places the wire 60 under constant pressure, so that when the wire 60 carries current to the heating element in tube 4 it will heat up just enough to expand the wire 60 to permit spring 61 on the short end of arm 57 to move the bushing 54 in a counter clockwise direction only far enough for the pawl 55 to advance the ratchet wheel 50 by one tooth and when the current to element in tube 4 is interrupted by the bimetal switch the wire 60 cools quickly thereby contracting in length which will impart a clockwise turning action to the bushing 54, and thereby move the member 57 and the pawl 55 back in position to engage the following tooth. The contraction of the wire 60 has sufficient power to stretch the spring 61 thereby storing enough energy in the spring 61 to move the ratchet wheel 54 by the pawl 55 when the heating and expansion of the wire 60 so permits.

Various timing periods are obtained by turning the dial or knob 46 which turns the shaft 47 that retards the cam 48A on disc 48 in relation to the ratchet wheel 50 by the slipping action of the friction clutch 49 and 49A to conform with the timing chart on the handle cover 20. For example, if the knob or dial 46 is turned to the figure 5 the cam 48A on cam disc 48 will be retarded just enough to require 5 oscillations of the bushing 54 to advance the cam 48A in a position to engage the member 38 and move it far enough, to permit the pin 43 to unlock the V-shaped teeth of partial disc 25 and allow spring 26 to return the knob 23 to its low temperature or warning position.

It can be readily seen that any position the knob 46 is set actually determines the oscillations or making and breaking of the current to the heating element by thermostatic switch 6, 8, and 9 that is required in order to advance the cam 48A in its unlocking position.

The other terminal 61A is connected to wire 59 which acts only as a conductor carrying current directly to one end of the element 4, the opposite end of element in tube 4 is connected to switch blade 8.

On the bottom of the housing 5 of the part 2 is a hole 73 large enough to assemble and adjust the switch within the housing and there is a circular cap 72 that is a press fit into the hole or opening 73.

The operation of my invention is as follows: after checking the chart on the handle to find the correct temperature and time setting for the particular food to be fried or cooked, the timer knob 46 is first turned to the proper time setting and then the temperature knob 23 is turned to the proper temperature and the food is placed in the pan. The current will then flow to the heating element in tube 4 on the bottom of the pan 1 through wires 60 and 59, however, wire 60 due to the resistance of the heating element is not thick enough to carry current without heating up sufficiently enough to expand in length, thereby permitting the spring 61 to turn L shaped member 57 with its pawl 55 to advance the ratchet wheel by one tooth. The position of the ratchet then remains unchanged until the circuit to the element in tube 4 is interrupted by the thermostatic switch 6, 8, and 9 then the wire 60 cools quickly contracting in length and thereby retarding the position of the pawl 55 to the following ratchet tooth on ratchet wheel 50 so as to be in a position to advance said ratchet wheel by one tooth when the thermostatic switch 6, 8, and 9 makes contact to permit the wire 60 to expand once again to follow the above described cycle until the predetermined time has been reached, and then the dial 23 is released and returns to the warming position.

I provide means to support the frying pan a substantial distance from the table it is used on by 4 plastic feet 68 that are evenly spaced and held on the bottom part 2 by screws 69.

The invention is waterproof up to the dial 23 and can be immersed in water when washed that far without damaging the unit. However, I have provided a rubber glove 70 that fits over the entire handle 19 and the outer edge of the glove being circular in cross section fits into a concave ridge 71 that is also circular in cross section and molded around the plastic handle 19 and when the glove is slipped over the handle 19 the edge 71 of the glove is placed in the concave ridge thereby rendering the entire handle water proof.

It can be readily seen that I have designed a new and novel frying pan which is fully automatic in every sense of the word, that the device is simple to operate, inexpensive to manufacture and capable of giving long and satisfactory service although I have shown a preferred embodiment thereof I do not wish to be limited to the particular details described, for example the invention could be made from castings instead of stampings, also the invention could be used for baking as well as boiling food without departing from the spirit or scope of the invention, therefore I intend to cover all constructions and arrangements coming within the definitions of my invention constituting the appended claims.

I claim:

1. In a time and heat controlled cooking vessel, the combination of a vessel portion, a bimetal strip in good heat conducting relationship with said vessel portion, an electric heating element in thermal heat conducting relationship with said vessel portion, an electrical circuit including said heating element, switch means connected in said circuit, means operatively connecting said bimetal strip and said switch means whereby said bimetal strip maintains said vessel portion at a selected predetermined temperature within a cooking range, and means responsive to the time lag produced by a series of successive switch operations controlled by said bimetal strip for terminating the cooking operation.

2. The cooking vessel of claim 1 wherein means are provided to maintain said vessel portion at a low or warming temperature after the termination of said cooking operation.

3. In a time and heat controlled frying pan having a heating element, a bimetal strip connected to said frying pan, a switch operated by said bimetal strip for controlling the current supplied to said heating element, a manual controlled dial for determining the temperature the bimetal strip shall actuate said switch, spring means constantly urging said dial to its low temperature position, means for locking said dial at any desired temperature within a cooking range substantially above the low temperature range and a timing mechanism responsive to a series of circuit making and breaking impulses for releasing said dial locking means and thereby permitting said dial to return to its low temperature range.

4. In a time and heat controlled cooking vessel, the combination of a vessel portion, a heating element in heat conducting relationship with said vessel portion, a switch, a bimetal strip in heat conducting relationship with said vessel portion for actuating said switch for supplying current to said heating element, a manual controlled dial for determining the temperature the bimetal strip shall actuate said switch, spring means constantly urging said dial to its low temperature position, means for resiliently locking said dial at any desired temperature within a cooking range substantially above the low temperature range and a timing mechanism responsive to a series of circuit making and breaking impulses for releasing said dial locking means and thereby permit said dial to return to its low temperature upon completion of a cooking operation.

5. In an electric frying pan, a vessel portion, a hollow handle, connected to support said vessel portion, a bimetallic element in good thermal conducting relationship with said vessel portion, a timing dial and a temperature controlling dial mounted on said handle, a timing mechanism and a heat controlling mechanism mounted within said hollow handle, the timing mechanism comprising a ratchet wheel, a pawl for actuating said ratchet wheel, and a current carrying wire within said handle and arranged to oscillate said pawl when first heated and then cooled, said pawl arranged to advance said ratchet wheel one tooth at a time in response to heating and cooling of said current carrying wire, said bimetallic element controlling the heating and cooling of said current carrying wire.

6. In an electric frying pan the combination of a vessel portion, an electric heating element mounted below said vessel portion and in good heat conduction with the bottom thereof, a bimetal strip secured to the bottom of said vessel portion, a switch adjacent said bimetal strip and arranged to be actuated by the bimetal strip, a hollow handle mounted on the vessel portion for carrying the same, a manual heat controlling means mounted on the handle, and mechanical means within the handle actuated by the manual heat controlling means and extending through the handle and connected to the switch member for adjusting the switch in relation to the bimetal strip for obtaining any predetermined temperature, and a timing mechanism including a current carrying wire responsive to heating and cooling of said current carrying wire for terminating the cooking operation after a predetermined period of time.

7. In an electric time and heat controlled frying pan, a thermostatically controlled switch on said pan, said thermostatically controlled switch including temperature responsive means and arranged to intermittently open and close said switch in response to temperature changes of said pan, a spring tending constantly to urge said thermostatic switch to its low temperature position, locking means for locking said thermostatic switch at any temperature above 220 degrees Fahrenheit and a timing mechanism comprising a ratchet wheel and an oscillating pawl for rotating the ratchet wheel tooth by tooth and a cam rotated by the ratchet wheel and adapted to release the locking means on said thermostatic switch at the expiration of a predetermined period of time.

8. In a frying pan, a vessel portion, an electric heating element for heating said vessel portion, a hollow handle connected to the vessel portion for holding said frying pan, a timing control knob and a heat control knob mounted on top of said hollow handle, a variable thermostatic switch adjacent the heating element below the vessel portion, mechanical means having one end actuated by the heat controlling knob mounted on said handle, and the opposite end of said mechanical means connected to the variable thermostatic switch below the vessel portion for control of the latter by the heat control knob on the handle, a spring connected to the heat control knob and tensioned so as to constantly urge said heat control knob to its low temperature position, and locking means arranged to lock said heat control knob at any position within a cooking range and timing means within said hollow handle and actuated by the timing knob on the handle for releasing the heat control knob from the locking means and permitting said heat control knob to return to its low temperature positions.

9. In an electric frying pan, the combination of a vessel portion, a hollow handle mounted on the vessel portion for holding or carrying the same, a manual operated knob mounted on vertical shaft above the handle, a disc mounted on said shaft within said handle a plurality of locking detents on said disc, a spring tending constantly to urge said vertical shaft and knob to its low temperature position, a sliding member and pin arranged to engage any detent on the disc member for obtaining any desirable temperature of the vessel portion a spring connected to the sliding member to constantly urge said sliding member and locking pin into locking engagement with said detents on said disc, a cam arranged to engage said sliding member and move same far enough to move the locking pin out of engagement of the detents on the disc, a ratchet wheel connected to the cam for rotating the same, a pawl connected to an oscillating member and arranged to engage the teeth of the ratchet wheel to thereby advance said ratchet wheel by a single tooth with each oscillating cycle, and a current carrying wire being under spring tension at all times and arranged to impart the oscillating action to the oscillating member when the current carrying wire is heated and cooled during a frying operation.

10. In a cooking vessel including a pan for containing the material to be cooked, an electric heating element mounted below the pan, an electric switch, a bimetal for actuating said switch mounted below the pan for intermittently opening and closing said switch for maintaining the pan at a predetermined temperature, a timing mechanism comprising a current carrying wire that is constantly under spring tension and arranged to heat up and expand when carrying current to the heating element and to quickly cool and contract when the current to the element is momentarily interrupted by the bimetal actuated switch, a ratchet wheel arranged to be rotated in a series of steps responding to the expansion and contraction of the current carrying wire and means for terminating the cooking cycle at the end of a predetermined number of expansions and contractions of the current carrying wire.

11. In a cooking vessel, a pan, an electric heating element mounted within the bottom of said pan, a hollow handle for carrying the pan connected thereto, a heat controlling selector mounted on said hollow handle, a variable thermostatic switch mounted within the bottom of said pan mechanically connected to the heat controlling selector, a spring connected to said heat controlling selector and tensioned so as to constantly urge said selector to its low temperature or warming position, a series of locking means corresponding to every temperature setting of the heat controlling selector thereby locking said heat controlling selector at any temperature selected and a heat actuated timing mechanism for releasing the locking means and permit the spring to return the heat selector to its low or warming temperature position at the end of a predetermined frying period.

12. In a cooking vessel having a means for rendering same fully water-proof, a pan for containing the material to be cooked, an electric heating element mounted within the bottom of said pan, a hollow handle for carrying the pan connected thereto, a heat controlling selector mounted on said hollow handle, a variable thermostatic switch mounted within the bottom of said pan and mechanically connected to the heat controlling selector, a spring connected to said heat controlling selector and tensioned so as to constantly urge said selector to its low temperature or warming position, a series of locking means corresponding to every temperature setting of the heat controlling selector thereby locking said heat controlling selector at any temperature selected and a heat actuated timing mechanism for releasing the locking means and permit the spring to return the heat selector to its low or warming temperature position at the end of a predetermined frying period.

13. An electrically heated cooking vessel comprising a sheet metal vessel portion the bottom of which defines a cooking surface, a sheet metal member engaging the bottom of said vessel portion in face-to-face contact over a substantial area, said member having a channel defined therein closed by the bottom of said vessel portion and an electrical heating element disposed in said channel, said member being fused to the bottom of said vessel portion to provide a completely sealed channel for said heating element whereby said cooking vessel can be immersed in liquid for cleaning purposes.

14. An electrically heated cooking vessel comprising a drawn sheet metal vessel portion the inside of which defines a cooking surface, a drawn sheet metal member engaging the outside of the bottom of said vessel portion in face-to-face contact over a substantial area, said member having a channel defined therein closed by said outside of the bottom of said vessel portion and an electrical heating element disposed in said channel, said member being fused to the said outside of the bottom of said vessel portion to provide a completely sealed channel for said heating element whereby said cooking vessel can be immersed in liquid for cleaning purposes.

15. The cooking vessel of claim 14 wherein said metal member has a boxlike housing open on one side drawn therein, which open side is closed by the bottom of said vessel portion.

16. The cooking vessel of claim 15 wherein a handle for said vessel is secured to said boxlike housing, and a temperature responsive device is disposed within said housing and supported in good thermal contact with the bottom of said vessel portion closing the open side of said boxlike housing.

17. The cooking vessel of claim 16 wherein a manual heat control means is mounted on said handle, mechanical means within said handle operatively connected to said manual heat control means, said mechanical means extending into said boxlike housing, switch means in said housing controlled by said temperature responsive device, and means relating said mechanical means and switch means.

18. In a cooking vessel or the like having means for automatically timing and maintaining a controlled temperature of said vessel, the combination of a metal cooking surface, an electric heating element for said surface, switch means for controlling the supply of electrical energy to said heating element, a single bimetal strip in good thermal conducting relationship with said cooking surface for controlling said switch means to maintain said surface at a preselected temperature, and means responsive to a predetermined series of actuations of said switch means by said single bimetal strip for automatically terminating said cooking operation.

19. The cooking vessel of claim 18 wherein said preselected temperature may be any cooking temperature, and wherein means are provided to maintain said cooking surface at a predetermined low temperature upon termination of said cooking operation.

20. The cooking vessel of claim 18 wherein said means responsive to a predetermined series of actuations of said switch means comprises a current carrying wire under spring tension and is energized when said heating element is energized.

21. An electrically heated cooking vessel comprising a vessel portion, the interior of which is defined by a first sheet of stainless steel thereby providing a stainless steel cooking surface, the exterior of at least the bottom of said vessel portion being defined by a second sheet of stainless steel, said second sheet being in face-to-face contact over a substantial area with the underside of said vessel portion having the interior defined by said first sheet, said second sheet having a channel defined therein closed by said underside, and an electrical heating element disposed in said channel, said second sheet being bonded to said underside to provide a completely sealed channel for said heating element whereby said cooking vessel can be immersed in liquid for cleaning purposes.

References Cited in the file of this patent

UNITED STATES PATENTS

| Number | Name | Date |
|---|---|---|
| 494,345 | Pearce | Mar. 28, 1893 |
| 772,590 | Varley | Oct. 18, 1904 |
| 1,028,107 | Hadaway et al. | June 4, 1912 |
| 1,174,032 | Hadaway | Feb. 29, 1916 |
| 2,221,863 | Crane | Nov. 19, 1940 |
| 2,388,641 | Meyers | Nov. 6, 1945 |
| 2,402,576 | Purpura | June 25, 1946 |
| 2,422,199 | Koci | June 17, 1947 |
| 2,443,806 | Shafter | June 22, 1948 |
| 2,597,805 | Kitto | May 20, 1952 |
| 2,624,269 | Hild | June 6, 1953 |
| 2,707,737 | Rich et al. | May 3, 1955 |
| 2,744,995 | Jepson | May 8, 1956 |
| 2,880,301 | Naxon | Mar. 31, 1959 |

FOREIGN PATENTS

| 618,921 | Great Britain | Mar. 1, 1949 |